(12) United States Patent
Murugesan et al.

(10) Patent No.: US 11,070,443 B1
(45) Date of Patent: *Jul. 20, 2021

(54) METHODS AND APPARATUS FOR CENTRALIZED OPERATIONAL MANAGEMENT OF HETEROGENOUS NETWORK DEVICES THROUGH SOFTWARE-BASED NODE UNIFICATION

(71) Applicant: Juniper Networks, Inc., Sunnyvale, CA (US)

(72) Inventors: Jaganathan S. Murugesan, Bangalore (IN); Srikanth Subramanian, Fremont, CA (US); Raymond Wing Cheh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,240

(22) Filed: May 5, 2020

Related U.S. Application Data

(63) Continuation of application No. 15/224,040, filed on Jul. 29, 2016, now Pat. No. 10,686,673.

(51) Int. Cl.
*H04L 12/24* (2006.01)
(52) U.S. Cl.
CPC .............. *H04L 41/20* (2013.01); *H04L 41/08* (2013.01)
(58) Field of Classification Search
CPC ...... G06Q 20/28; G06Q 20/36; G06Q 20/227; G06Q 20/105; G06Q 20/12; G06Q 20/3552; G06Q 30/0601; G06F 16/958; G06F 17/2235; H04L 41/20
See application file for complete search history.

(56) References Cited

U.S. PATENT DOCUMENTS

| | | | |
|---|---|---|---|
| 6,609,155 B1 | 8/2003 | Taylor | |
| 6,795,862 B1 | 9/2004 | Keohane et al. | |
| 7,398,307 B2* | 7/2008 | Dorland | H04L 29/06 709/217 |
| 8,516,529 B2 | 8/2013 | Lajoie et al. | |
| 8,751,537 B1 | 6/2014 | Zhang et al. | |
| 9,031,901 B1 | 5/2015 | King et al. | |
| 9,362,746 B2* | 6/2016 | Shaffer | H02J 3/00 |
| 9,380,074 B2* | 6/2016 | Zhang | H04L 41/0893 |
| 9,418,040 B2* | 8/2016 | Cordray | H04L 69/40 |
| 10,305,750 B1 | 5/2019 | Subramanian et al. | |
| 10,339,281 B2 | 7/2019 | Cholas et al. | |

(Continued)

*Primary Examiner* — Sargon N Nano
(74) *Attorney, Agent, or Firm* — Cooley LLP

(57) ABSTRACT

Apparatus and methods described herein relate to an apparatus including a memory and a processor operatively coupled to the memory. The processor can receive a set of network management device packages associated with a set of network management devices. The processor can merge a set of management device schema commands from the set of network management device packages with a unified schema to produce unified schema information. The processor can receive a unified schema command signal based on the unified schema information, and can convert the unified schema command signal into a set of management device schema command signals using the unified schema. The processor can also send each management device schema command signal from the set of management device schema commands, to network management devices.

20 Claims, 9 Drawing Sheets

(56) References Cited

U.S. PATENT DOCUMENTS

| | | | |
|---|---|---|---|
| 10,686,675 B2 * | 6/2020 | Cordray | H04L 41/0246 |
| 2006/0092861 A1 * | 5/2006 | Corday | H04L 41/0246 |
| | | | 370/256 |
| 2008/0215520 A1 | 9/2008 | Gu et al. | |
| 2008/0288618 A1 * | 11/2008 | Vardi | H04L 67/2823 |
| | | | 709/223 |
| 2010/0094981 A1 * | 4/2010 | Cordray | H04L 41/082 |
| | | | 709/222 |
| 2012/0310434 A1 | 12/2012 | Taft | |
| 2013/0095864 A1 | 4/2013 | Marovets | |
| 2016/0134491 A1 * | 5/2016 | Cordray | H04L 41/0816 |
| | | | 709/224 |
| 2016/0274870 A1 | 9/2016 | Seidman | |
| 2016/0323153 A1 * | 11/2016 | Cordray | H04L 67/1002 |
| 2016/0350392 A1 * | 12/2016 | Rice | G06F 16/27 |
| 2017/0289900 A1 | 10/2017 | Tchigevsky et al. | |
| 2019/0095345 A1 | 3/2019 | Zmudzinski et al. | |

* cited by examiner

METHODS AND APPARATUS FOR CENTRALIZED OPERATIONAL MANAGEMENT OF HETEROGENOUS NETWORK DEVICES THROUGH SOFTWARE-BASED NODE UNIFICATION

CROSS-REFERENCE TO RELATED APPLICATION

This application is a continuation of U.S. patent application Ser. No. 15/224,040, now U.S. Pat. No. 10,686,673, filed on Jul. 29, 2016, and entitled "Method and Apparatus for Centralized Operational Management of Heterogeneous Network Devices Through Software-Based Node Unification", the disclosure of which is incorporated herein by reference in its entirety.

FIELD

The methods and apparatus described herein are generally related, for example, to a centralized operational management of diverse network platforms, through software node unification.

BACKGROUND

In some known network systems, a network controller can control a number of network devices. For example, a network controller can be configured to send operational signals to other network devices in a network. In some known network systems, however, each network device can run one of many possible software configurations. Thus, in some known network systems, when a network administrator provides instructions to the network controller, a network administrator can be required to generate different operational commands for each network device the network administrator is configuring. Alternatively, in some known systems, a network administrator can store schemas from each of the network devices. Storing schemas for several network devices, however, can be resource-intensive and can involve transmission of large quantities of data.

Accordingly, a need exists for methods and apparatus that can allow a network controller to provide a unified interface and mechanism to provide operational instructions to network management devices in an efficient manner.

SUMMARY

In some implementations, an example apparatus can include a memory and a processor operatively coupled to the memory. The processor can receive a set of network management device packages associated with a set of network management devices, and can merge a set of management device schema commands from the set of network management device packages with a unified schema to produce unified schema information. The processor can receive a unified schema command signal based on the unified schema information, the unified schema command signal including an instruction for a subset of the set of network management devices. The processor can convert the unified schema command signal into a set of management device schema command signals using the unified schema, each management device schema command signal from the set of management device schema command signals being associated with a management device schema command from the set of management device schema commands. The processor can also send each management device schema command signal from the set of management device schema commands.

In another implementation, an example apparatus includes a memory and a processor operatively coupled to the memory. The processor can receive network management device packages associated with network management devices, and can merge management device schema commands from the network management device packages with a unified schema to produce unified schema information. The processor can send a signal including the unified schema information. The processor can receive a unified schema command signal based on the unified schema information, the unified schema command signal including an instruction for a subset of the plurality of network management devices. The processor can also send the unified schema command signal to each network management device from the network management devices. The processor can receive a signal from a network management device from the subset of the network management devices, the signal indicating that the unified schema command signal is applicable to the network management device. The processor can also instruct the network management device to implement instructions included in the unified schema command signal.

In another implementation, an example apparatus includes a memory and a processor operatively coupled to the memory. The processor can receive network management device packages associated with network management devices, and can merge management device schema commands from the network management device packages with a unified schema. The processor can generate a network management device interface accessible by a network administrator, the network management device interface configured to receive instructions from the network administrator to perform operations on a subset of the network management devices. The processor can convert the instructions received at the network management device interface into management device schema command signals, each management device schema command signal from the management device schema command signals being associated with a management device schema command from the management device schema commands. The processor can send each management device schema command signal from the plurality of management device schema commands to a network management device from the subset of the plurality of network management devices, the network management device being associated with the management device schema command associated with that management device schema command signal.

DETAILED DESCRIPTION

In some implementations, a user operating a network administrator device can input and/or generate operational commands for multiple network management devices, using a unified interface, without separately accessing each network management device to configure that network management device. For example, the unified interface allows for a network administrator to configure multiple network management devices of a similar make and/or model, in a parallel. A user operating the network administrator, for example, can enter operation input into the unified interface. The unified interface can provide the input to a network controller having a management daemon, which can identify which network management devices to which to send operational commands (based on the provided input). The management daemon can generate the operational commands for each of the identified network management devices, and can provide the operational commands to a node unifier daemon, so as to send the operational commands to the identified network management devices. Thus, the unified interface allows for the network controller to generate and send operational commands to different network management devices, via a single, unified interface.

In further implementations, network management device packages can allow a unified interface to efficiently generate operational commands for multiple network management devices. For example, network management device packages can serve as compressed and/or abbreviated versions of a network management device operational schema (e.g., a schema that can be used to generate operational commands that can instruct network management devices to perform a specified operation). Thus, receiving network management device packages can result in reduced transmission of data (e.g., as a device, such as a network administrator device, that sends the network management device packages need not send a fully-generated network management device schema). Further, by storing the network management device packages, rather than storing full network management device schemas, a network controller can reduce the amount of data stored at the network controller, and therefore both store a larger amount of data pertaining to operational commands, and can reduce the amount of memory space generally allocated to operational command data.

Figure 1:
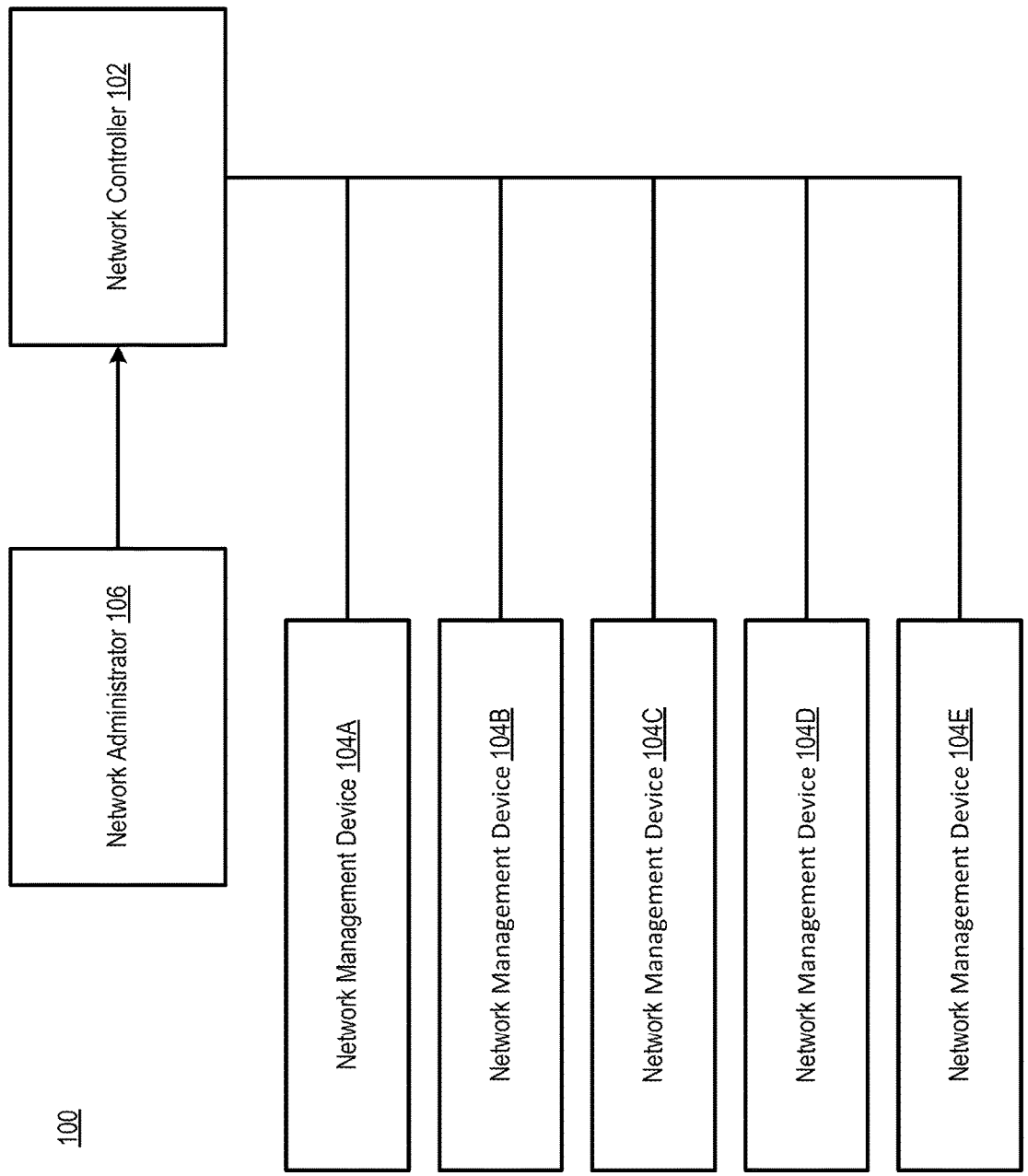
FIG. 1 is a schematic diagram illustrating a network controller, a network administrator, and network management devices, according to an embodiment.

FIG. 1 is a schematic diagram illustrating an example network 100. For example, in some implementations, the network 100 can include a network controller 102, a set of network management devices 104A-E, and a network administrator 106. The network controller 102 can be operatively coupled to the network administrator 106, and each of the network management devices 104A-E. As noted in FIGS. 2-5, for example, the network administrator 106 can send operational commands and/or other information to the network controller 102, which can process the operational commands prior to sending operational commands to network management devices 104A-E.

In some implementations, the network administrator 106 can be a network device and/or a user operating a network device. A network administrator 106 device can include at least one processor, at least one memory, at least one communications interface, and/or at least one display interface configured to render at least one unified interface (not shown in FIG. 1). The at least one processor can be any hardware module and/or component configured to receive and process data, and/or to execute code representing executable instructions. In some implementations, for example, the at least one processor can be a general purpose processor, a Field Programmable Gate Array (FPGA), an Application Specific Integrated Circuit (ASIC), a Digital Signal Processor (DSP), and/or the like. The at least one memory can be a hardware module and/or component configured to store data accessible by the at least one processor, and/or to store code representing executable instructions for the at least one processor. The memory can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory stores instructions to cause the at least one processor to execute modules, processes and/or functions associated with the network administrator 106.

Figure 2:
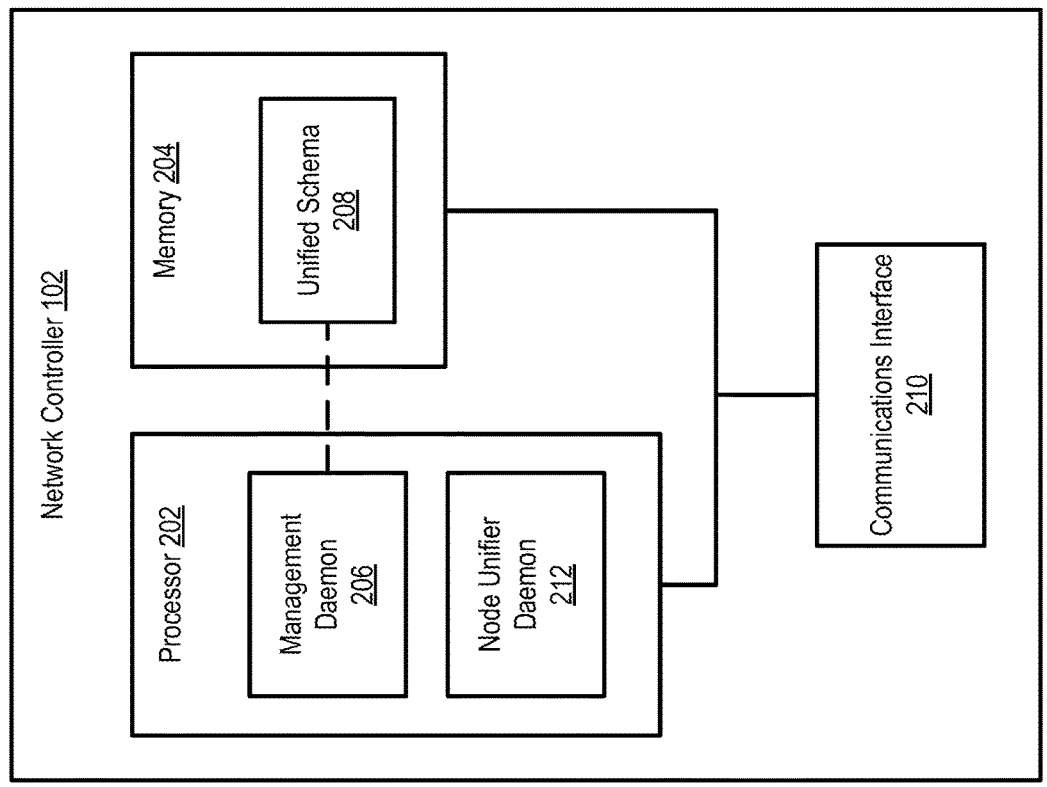
FIG. 2 is a schematic diagram illustrating a network controller, according to an embodiment.

Referring to FIG. 2, in some implementations, a network controller 102 can include at least one processor 202, at least one memory 204, and at least one communications interface 210. The at least one processor 202 and the at least one memory 204 can be similar to the at least one processor and at least one memory of the network administrator 106. The network controller 102 can be a controller configured to manage instructions sent to various network management devices 104A-E in the network. For example, the network controller 102 can be a controller configured to receive operational commands from a network administrator 106, to process the operational commands, and to send processed operational commands to relevant network management devices 104A-E. In some implementations, the network control 102 can act as a unified interface and/or a master operational device for all network management devices 102A-E in a network.

The at least one processor 202 can include and/or implement a management daemon 206 and a node unifier daemon 212. The management daemon 206 can be a background software process (executed by at least one processor 202), and/or a specialized circuit included in and/or operatively coupled to the at least one processor 202 and configured to implement a background software process. The management daemon 206 can be configured to determine when operational commands have been generated for any of the network management devices 104A-E, and to send a message to a similar daemon at the node unifier controller 108 indicating that an operational command has been generated for a network management device 104 and/or a set of operational commands has been generated for a set of network management devices 104A-E. Operational commands can include commands that are generated to elicit an action by network management device 104, and/or to obtain information from the network management devices 104A-E. As one example, an operational command can resemble:

```
user@controller1> show interfaces fxp0 terse device-list all
controller1
Interface    Admin    Link    Proto    Local         Remote
fxp          up       up
```

-continued

| | | | | | |
|---|---|---|---|---|---|
| fxp0.0 | up | up | met | 192.168.179.52/25 | |
| jnu-sat1 | | | | | |
| error: device fxp0 not found | | | | | |
| jnu-sat2 | | | | | |
| Interface | Admin | Link | Proto | Local | Remote |
| fxp0 | up | up | | | |
| fxp0.0 | up | up | met | 192.168.179.33/25 | | where the operational command is a command to the network controller 102 (e.g., "controller1") to view information about network management devices 104A-B (e.g., "jnu-sat1" and "jnu-sat2") that are operatively connected to a particular interface (e.g., interface "fxp0").

The at least one memory 204 can store, for example, a unified schema 208, specifying unified instructions (e.g., instructions interpretable by multiple different network management devices 104A-E) for configuring each of the network management devices 104A-E. The node unifier daemon 212 can also be a background software process, and/or a specialized circuit included in and/or operatively coupled to the at least one processor 202 and configured to implement a background software process. The node unifier daemon 212 can be configured to communicate with network management devices 104A-E (e.g., to send operational commands to the network management devices 104A-E, to receive confirmation from the network management devices 104A-E that the operational commands will be implemented, and/or the like).

For example, the unified schema 208 can be a data structure that includes mappings between a unified operational command generated for each type of operational command that can be made to each network management device 104 from the set of network management devices 104A-E, and multiple management device schema operational commands associated with each network management device 104 from the set of network management devices 104A-E. In some implementations, the unified schema 208 and management device schemas can be stored as type-length-value (TLV) packages. When the network administrator 106 sends operational information to the network controller 102, the operational information can include a unified schema operational command. The unified schema operational command can be translated into a management device schema operational command based on the unified schema 208. In some implementations, the unified schema can be associated with and/or used by the management daemon 206, and may not be useable and/or accessible by the node unifier daemon 208. Further details regarding the unified schema 208, management device schemas, and/or the like can be found at least in the discussion of FIGS. 4 and 6-9. The communications interface 210 can be operatively coupled to the at least one processor 202, and can be configured to send and/or receive communications from other network devices, including the network administrator 106, the node unifier controller 108, and/or the network management devices 104A-E. In some implementations, the network controller 102 can communicate with network management devices 104A-E through Network Configuration Protocol (NETCONF) over secure shell (ssh) protocol.

Figure 3:
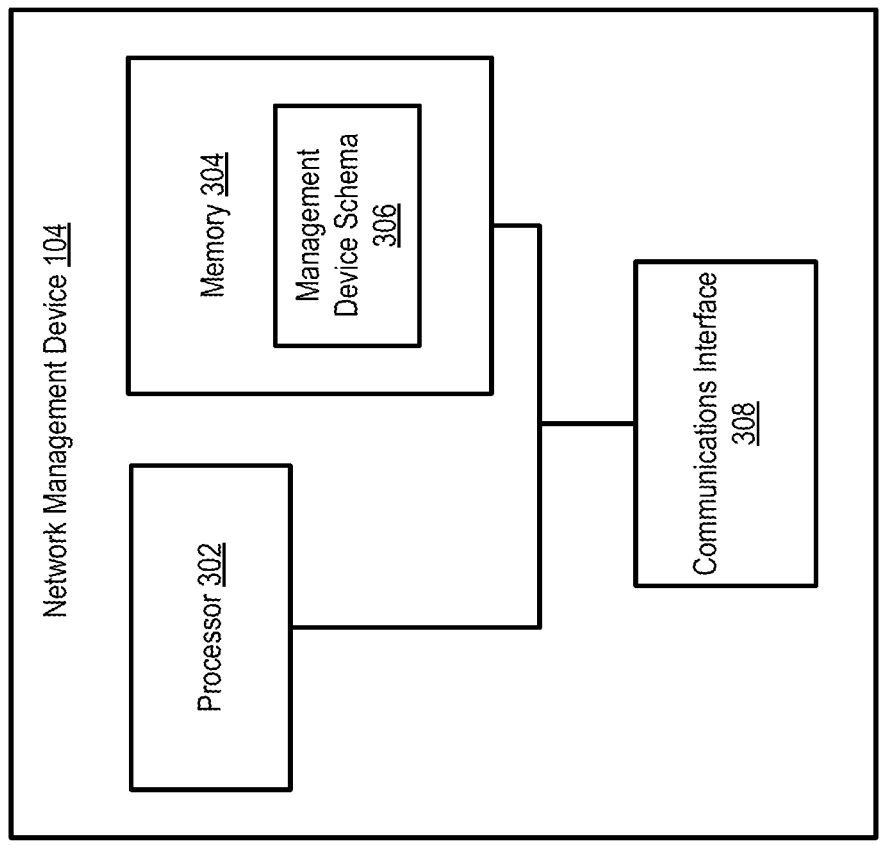
FIG. 3 is a schematic diagram illustrating a network management device, according to an embodiment.

Referring to FIG. 3, in some implementations, a network management device 104 can include at least one processor 302, at least one memory 304, and/or at least one communications interface 308. The at least one processor 302 and the at least one memory 304 can be similar to the at least one processor and at least one memory of the network controller 102. The network management device 104 can be a network device (e.g., including but not limited to a network switch, a network router, and/or the like) operating within a network. As one example, network management devices 104A-E can be data center network switches operating in a network, and/or other types of network device supporting network configuration protocol (NETCONF). The network management device 104 can be configured to receive operational commands from the network controller 102 (specifically, the node unifier daemon 212 of the network controller 102). The at least one memory 304 can include a management device schema 306, i.e., a data structure including operational instructions (e.g., instructions based on the NETCONF protocol and/or the command-line interface (CLI) protocol) for the network management device 104. The network management device 104 can send a network management device package to the network controller 102 that includes information that can be used to generate a management device schema 306, and/or can use a copy of a management device schema 306 stored at the network management device 104 to determine whether an operational command received by the network management device 104 can be implemented and/or executed at the network management device 104. In some implementations, the network management device package can be a binary data structure encoding data fields and/or parameters, and/or including references to data files and/or other information, that can be included in various operational commands, and/or other information for generating management device schemas 306. A management device schema 306 can be a graph data structure including data nodes representing various operational commands in a specified hierarchy. A network management device package can therefore be a smaller, more efficient manner of storing and transmitting the management device schema 306, reducing the amount of data transmitted and/or processed by the network controller 102. Further information regarding the management device schema 306 can be found, e.g., in the discussion of FIGS. 4 and 6-9. The communications interface 308 can be configured to send and/or receive communications from the network controller 102 and/or the node unifier controller 108.

Figure 4:
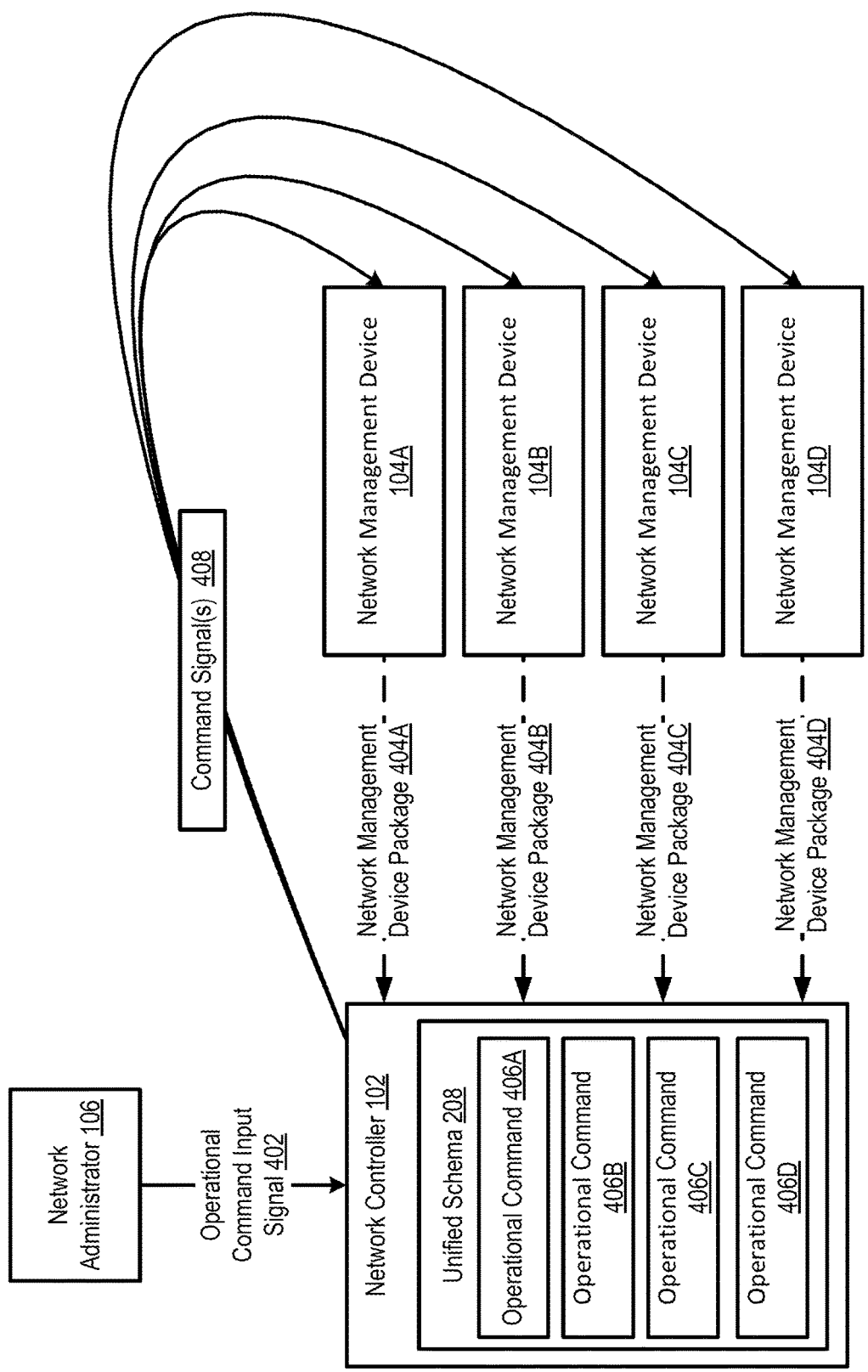
FIG. 4 is a schematic diagram illustrating modifying network management devices, according to an embodiment.

FIG. 4 is a schematic diagram illustrating modifying network management devices, according to an embodiment. For example, in some implementations, a network controller 102 can receive copies of network management device packages 404A-D for each network management device 104A-D, respectively, e.g., from each of the network management devices 104A-D, and/or from the network administrator 106. The network controller 102 can incorporate operational commands 406A-D from each of the network management device packages 404A-D into a unified schema 208. A network administrator 106 can send an operational command input signal 402 to the network controller 102, e.g., including an operational command 406 to instruct a network management device 104A and/or a set of network management devices 104A-D to act in a specified manner. Input for generating an operational command 406A can be generated by a user at a network administrator 106, and/or can be automatically generated by a network administrator device 106, e.g., based in a network event, a network management device status, and/or the like. The network controller 102 can generate multiple command signals 406 based on the operational commands 406A-D incorporated in the unified schema 208. For example, the network controller 102 can determine a set of network management devices 104A-D to which the unified schema command signal from the network administrator 106 can be sent, e.g., based on network management device identifiers included in the unified schema command signal. The network controller 102 can then generate an operational command 406 for each network management device 104A-D associated with one of those identifiers.

Figure 5:
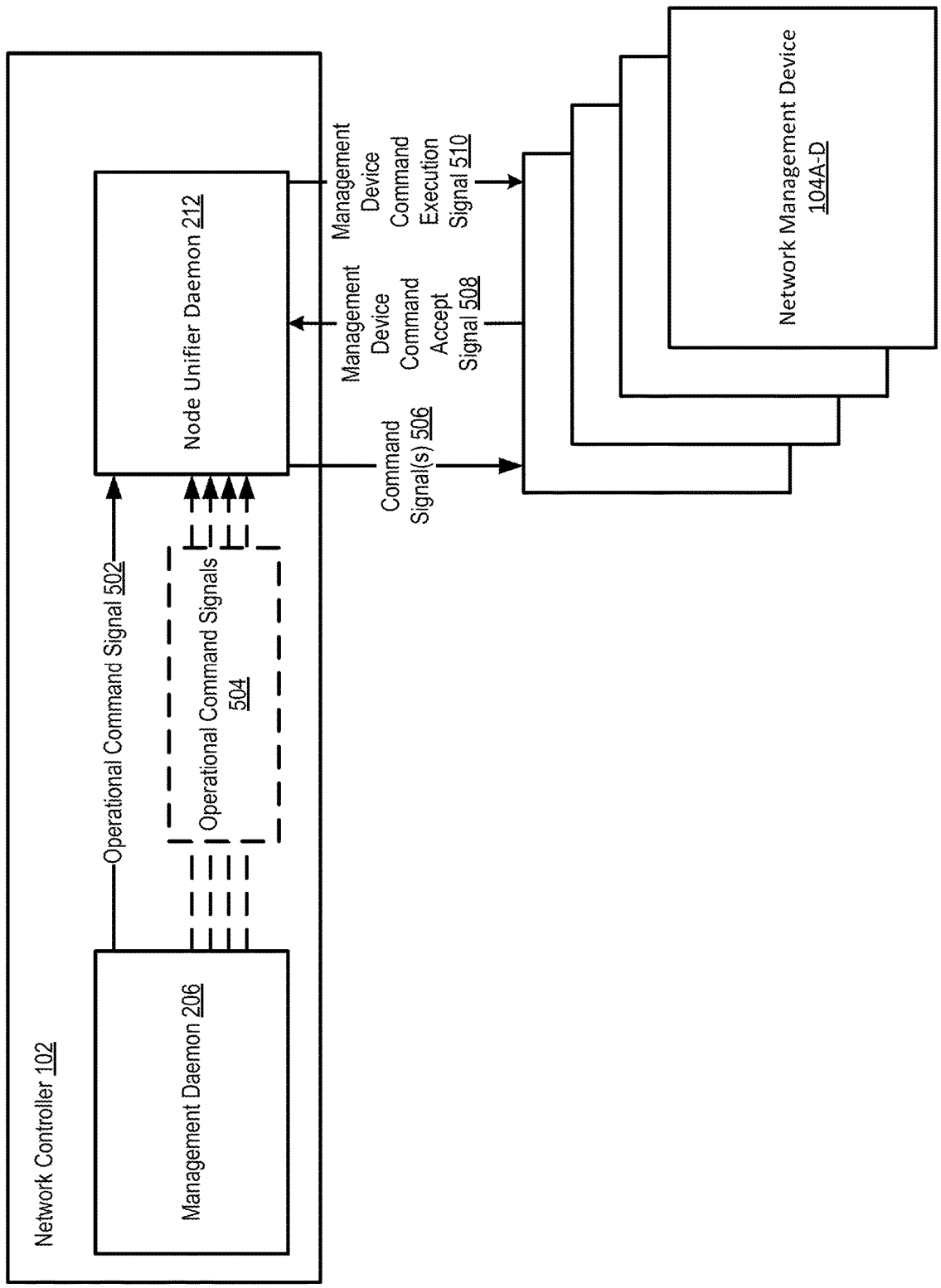
FIG. 5 is a schematic flow diagram illustrating distributing command signals, according to an embodiment.

FIG. 5 is a schematic flow diagram illustrating distributing command signals. For example, in some implementations, a management daemon 206 of a network controller 102 can send an operational command signal 502 to a node unifier daemon 212 of the network controller 102, and/or otherwise notify the node unifier daemon 212, when the management daemon 206 has generated an operational command 406 for a network management device 104. In some implementations, if the management daemon 206 generates operational commands 406 for multiple network management devices 104A-D, the management daemon 206 can send a batch of operational command signals 504 to the node unifier daemon 212, and/or can send one or more notifications to the node unifier daemon 212 indicating that operational commands 406 have been generated for multiple network management devices 104A-D. The node unifier daemon 212 can send a command signal 506 to each network management device 104 for which an operational command 406 has been generated. The command signal 506 can include the operational command generated for that network management device 104.

The respective network management device(s) 104 can determine whether or not that network management device 104 can implement the operational command 406. If a network management device 104 that has received an operational command 406 can implement that operational command 406, the network management device 104 can send a management device command accept signal 508 to the node unifier daemon 212, indicating that the network management device 104 can accept the operational command 406. The node unifier daemon 212 can then send a management device command execution signal 510 to the network management device 104 to instruct the network management device 104 to implement the operational command 406. The node unifier daemon 212 can also notify the management daemon 206 that the network management device 104 can implement the operational command 406 (e.g., via a notification signal not shown in FIG. 5), such that the management daemon 206 can update records and/or logs to note that the network management device 104 is implementing the operational command 406.

Figure 6:
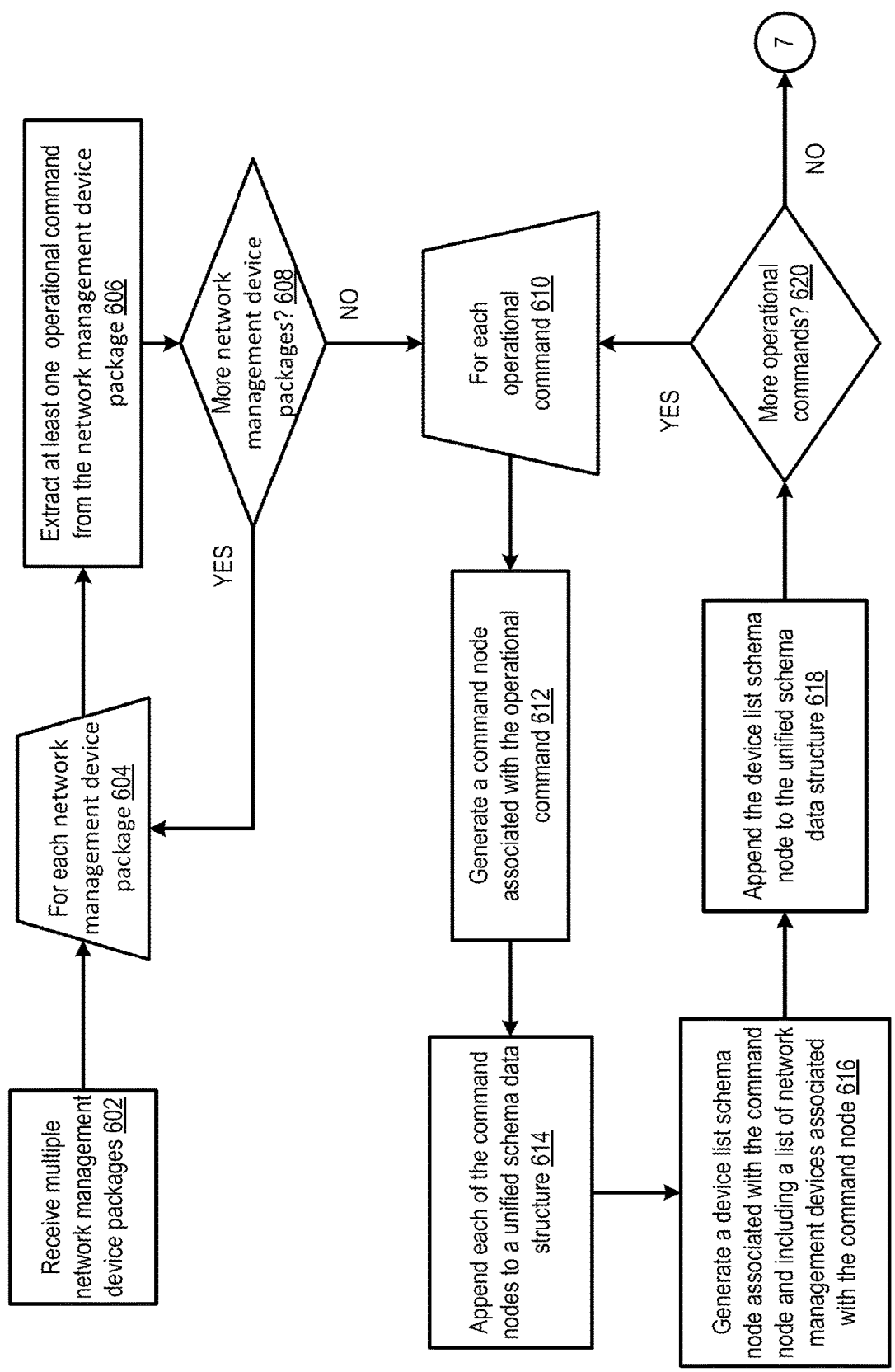
FIG. 6 is logic flow diagram illustrating generating a unified schema, according to an embodiment.

FIG. 6 is logic flow diagram illustrating generating a unified schema 208, according to an embodiment. For example, in some implementations, a network controller 102 can, at 602, receive multiple network management device packages 404A-D (e.g., from network management devices 104, from a network administrator 106, and/or the like). For each network management device package 404 received (e.g., at 604), the network controller 102 (e.g., the management daemon 206 of the network controller 102) can, at 606, extract at least one operational command 406 from the network management device package 404. If there are additional network management device packages to process (e.g., at 608), the network controller 102 can continue to extract operational commands 406 from the remaining network management device packages 404 (e.g., can repeat 604-608).

When each of the network management device packages 404A-D has been processed, the network controller 102 can append each of the operational commands 406 to a unified data structure 208. For example, the network controller 102 can, for each operational command 406 (e.g., at 610), generate, at 612, a command node data structure that includes parameters, syntax, and/or other information for generating that operational command 406, and that represents that operational command 406. An example command node data structure can, in some implementations, resemble the following:

```
struct ddl_node_s {
    struct ddl_node_s *dn_next;              /* Next node in global chain */
    struct ddl_node_s *dn_parent;            /* Parent node (if simple node) */
    const char *dn_type_name;                /* Type name for type reference */
    void *dn_opaque;                         /* Type specific information */
    const char *dn_cprefix;                  /* C-language prefix for all fields */
    const char *dn_match;                    /* Regexp to match against */
    const char *dn_match_message;            /* English version of the same */
    const char *dn_text;                     /* Text tag */
    const char *dn_contains_node;            /* 'alias' to a object */
    const char *dn_confirm;                  /* Request confirmation (for commands) */
    ddl_dcf_option_t *dn_dcf_option;         /* Option tag (for DCF commands) */
    const char *dn_option;                   /* Option tag (for commands) */
    const char *dn_alias;                    /* Alias for file data entry */
    const char *dn_xml_name;                 /* XML form of name */
    unsigned short dn_max_elements;          /* Maximum number of active elements */
    ddl_products_t dn_products;              /* Set of products this node matters */
    ddl_products_t dn_products_exclude;      /* Set of products to hide */
    ddl_hidden_t dn_hidden;                  /* Hidden (defined above) */
    ddl_impact_t dn_impact_level;            /* Impact Level of a operational command */
    ddl_licenses_t dn_licenses;              /* Set of licensed features */
    ddl_shell_cmd_t *dn_shell_cmd;           /* Shell command to execute */
    ddl_interface_acceptable_t **dn_if_acceptable;   /* Interface mask to display */
                                             /*attribute */
    ddl_daemon_map_t dn_enable_process_map;  /* Bitmap of process to enable */
    ddl_cmd_fwding_t *dn_cmd_fwding;         /* cmd forwarding config */
                                             /* if configured */
    const char *dn_xml_prop_file;
    ddl_flags_t dn_ddc_flags;
    ddl_exemps_t dn_ddc_exemps;
    ddl_nodeid_t dn_id;                      /* Node ID; index into node table */
    ddl_attrid_t dn_aid;                     /* Attribute ID of this node in parent */
    unsigned char dn_model;                  /* Model style */
    unsigned char dn_numident;               /* Number of name attributes */
```

-continued

```
unsigned char dn_numpeers;    /* Number of peer (positional) attributes */
dbs_offset_t dn_name;         /* Name of this node */
dbs_offset_t dn_child;   /* Child node (if simple node) */
ddl_flags_t dn_flags;         /* Flags (defined above) */
ddl_require_t dn_require;     /* Required permission bits */
ddl_type_t dn_type;           /* Type of this node */
unsigned short dn_numchild;   /* Number of immediate children */
dbs_offset_t dn_type_ref;     /* Reference to object type's node */
dbs_offset_t dn_default;      /* Default value in string form */
dbs_offset_t dn_value;        /* Value of this tag */
dbs_offset_t dn_help;         /* Help information */
ddl_action_t dn_actions;      /* Which actions are present for this node */
dbs_offset_t dn_action_map;   /* Associated actions */
short dn_choice;              /* Choice number */
unsigned short dn_sizeof;     /* Size of the item being built */
unsigned short dn_objsize;    /* Size of referenced object (if OBJECT) */
unsigned short dn_offsetof;   /* Offset of " " " " */
};
```

As noted above, the command node data structure can include references to other command nodes to which the command node data structure is related, default operational command values, an impact level of operational command, and/or other information that can be used to formulate an operational command for generating an operational command. In some implementations, a device list schema node can be a second node associated with (e.g., connected to) the command node, and that includes a list of network management devices 104A-E to which the command node data structure can apply. In other implementations, a device list schema node can be a field and/or attribute of the command node data structure. Specifically, instead of generating separate nodes, the command node data structure can both include information for generating a operational command, and a list of network management devices 104A-E capable of executing an operational command represented by the command node data structure. The unified data structure 208 can be a graph data structure including multiple data nodes, e.g., corresponding to the operational commands, and/or other information. The network controller 102 can, at 614, append each of the generated command nodes to a unified schema data structure 208. The unified schema data structure 208 can be a graph, eXtensible markip language (XML), and/or a similar data structure to which command nodes can be added. Each command node in the unified schema 208 can be organized in a hierarchical structure (e.g., based on command nodes requiring similar parameters and/or other information to generate operational commands 406, and/or the like).

For example, in some implementations, the hierarchy can be a tree data structure and/or tree-based database to which command node data structures can be appended at particular levels. Each network management device package associated with a command node can include an indication of a hierarchy level at which the command node data structure can be added. The network controller 102 can then compare the hierarchy level of each command node, to determine where to add a new command node in the command node hierarchy. For example, a first network management device package can include an indication that a command node, generated based on the information in the first network management device package, will depend on command nodes generated based on a second network management device package. When a command node is generated based on the first network management device package, the network controller 102 can add the command node as a child node to a command node, in the hierarchy, that was generated based on the second network management device package.

The network controller 102 can also, at 616, generate a device list schema node that can be associated with a command node when the command node is appended to the unified schema data structure 208. A device list schema node can be a node data structure included in the unified schema data structure, and that includes a reference to one or more command nodes, as well as a list of network management devices 104A-D associated with the one or more command nodes. The network controller 102 can then, at 618, append the device list schema node to the unified schema data structure 208. If there are additional operational commands 406 to process (e.g., at 620), the network controller 102 can continue to process the operational commands 406 by generating command nodes and device list schema nodes, and appending said nodes to the unified schema data structure 208 (e.g., can repeat 610-620 until each operational command 406 is represented by a command node in the unified schema data structure 208). In some implementations, if an existing device list schema node in the unified schema data structure 208 already includes each of the network management devices 104 with which the command node will be associated, the network controller 102 can, instead of generating a new device list schema node, associate the existing device schema node with the command node.

Figure 7:
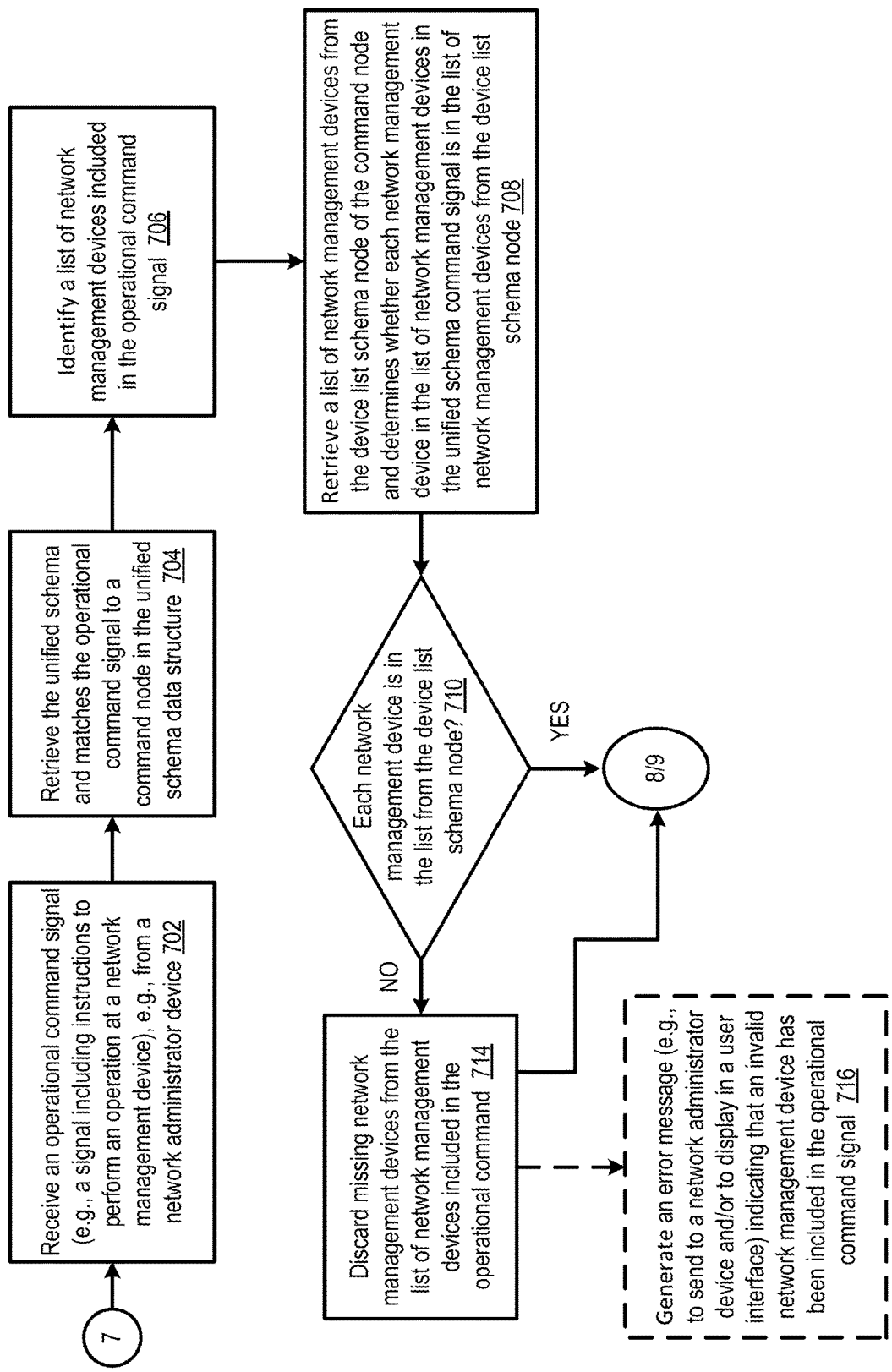
FIG. 7 is logic flow diagram illustrating receiving a unified schema command signal from a network administrator, according to an embodiment.

Continuing from FIG. 6, FIG. 7 is logic flow diagram illustrating receiving a unified schema command signal from a network administrator 106. For example, in some implementations, after a unified schema 208 has been generated, a network controller 102 (e.g., the management daemon 206 of the network controller 102) can receive, at 702, an operational command signal (e.g., from a network administrator 106). The operational command signal can include instructions to perform an operation at a network management device 104. The management daemon 206 can retrieve, at 704, a unified schema data structure 208, and can match operational command input in the operational command signal to a command node in the unified schema data structure 208. For example, the operational command signal can include operational command input that specifies an operation to be performed, and/or a target for the operation instruction. The management daemon 206 can match the operational command input with operational commands 406 stored in the command nodes of the unified schema data structure 208. As another example, the operational command signal can include a network management device identifier, with which the management daemon 206 can find at least one device list schema node including that network management device identifier. The management daemon 206 can then provide a list of the command nodes associated with the at least one device list schema node (e.g., can display the operational commands 406 associated with the command nodes in a unified interface instantiated by the management daemon 206, can send the list of operational commands and/or command nodes to the network administrator 106, and/or the like).

The management daemon 206 can then, at 706, identify a list of network management devices 104 included in the operational command signal. The list of network management devices 104 can be a list of network management devices 104 to which operational commands will be sent, The management daemon 206 can, at 708, retrieve a list of network management devices 104 from a device list schema node associated with the command node matched to the operational command signal. As noted above, the list of network management devices 104 stored at the device list schema node can include network management devices 104 with which an operational command associated with the command node is associated. The management daemon 206 can compare the list of network management devices 104 from the device list schema node, to the network management devices 104 included in the operational command signal, to determine whether any network management devices 104 included in the operational command signal are not included in the device list schema node. Said another way, the management daemon 206 can determine whether each network management device 104 included in the operational command signal has been associated with the command node of the unified schema 208 (and therefore whether the management daemon 206 can send an operational command 406 associated with the command node to that network management device 104). If (e.g., at 710) there is at least one network management device 104 included in the operational command signal that does not appear in the device list schema node, the management daemon 206 can discard that at least one network management device 104 (e.g., at 714), so as to generate operational commands 406 for the remaining network management devices 104 that do also appear in the device list schema node, and so as to not generate operational commands 406 for the network management devices 104 that do not appear in the device list schema node. The management daemon 206 can also optionally, at 716, generate an error message (e.g., to a network administrator 106) indicating that an invalid network management device 104 was included in the operational command signal. In some implementations, the error message can be sent directly to the network administrator 106, and can be displayed in a unified interface for a user to review, and/or the like).

Figure 8:
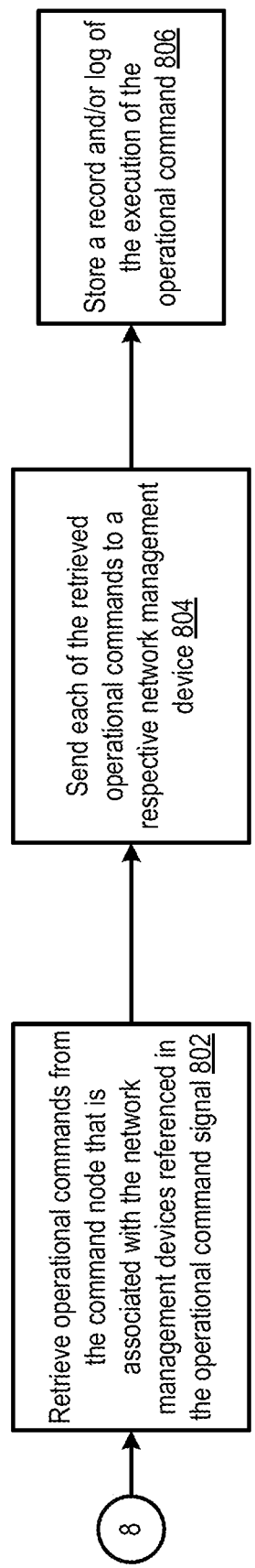
FIG. 8 is logic flow diagram illustrating distributing an operational command, according to an embodiment.

Continuing from FIG. 7 (e.g., from the perspective of a network controller 102), FIG. 8 is logic flow diagram illustrating distributing an operational command 406. For example, in some implementations, to generate an operational command 406 for a network management device 104, a network controller 102 (e.g., a management daemon 206) can, at 802, retrieve operational commands 406 from a command node of a unified schema 208 stored at the network controller 102. The command node can be associated with a particular network management device 104 and/or a set of network management devices 104 identified in an operational command signal sent to the network controller 102 (e.g., by a network administrator 106). The command node can also include a set of operational commands 406 associated with the network management device 104. The network controller 102 (e.g., a node unifier daemon 212) can modify the set of operational commands 406 based on input received at the network controller 102 (e.g., from a network administrator 106) that indicates parameter values, and/or other information. The node unifier daemon 212 can then, at 804, send each of the retrieved operational commands 406 to its respective network management device 104. The network management device 104 can receive the operational command 406 from the node unifier daemon 212 and can execute the operational command 406. The node unifier daemon 212 can store a record and/or log of the execution of the operational command 406 (e.g., at 806).

Figure 9:
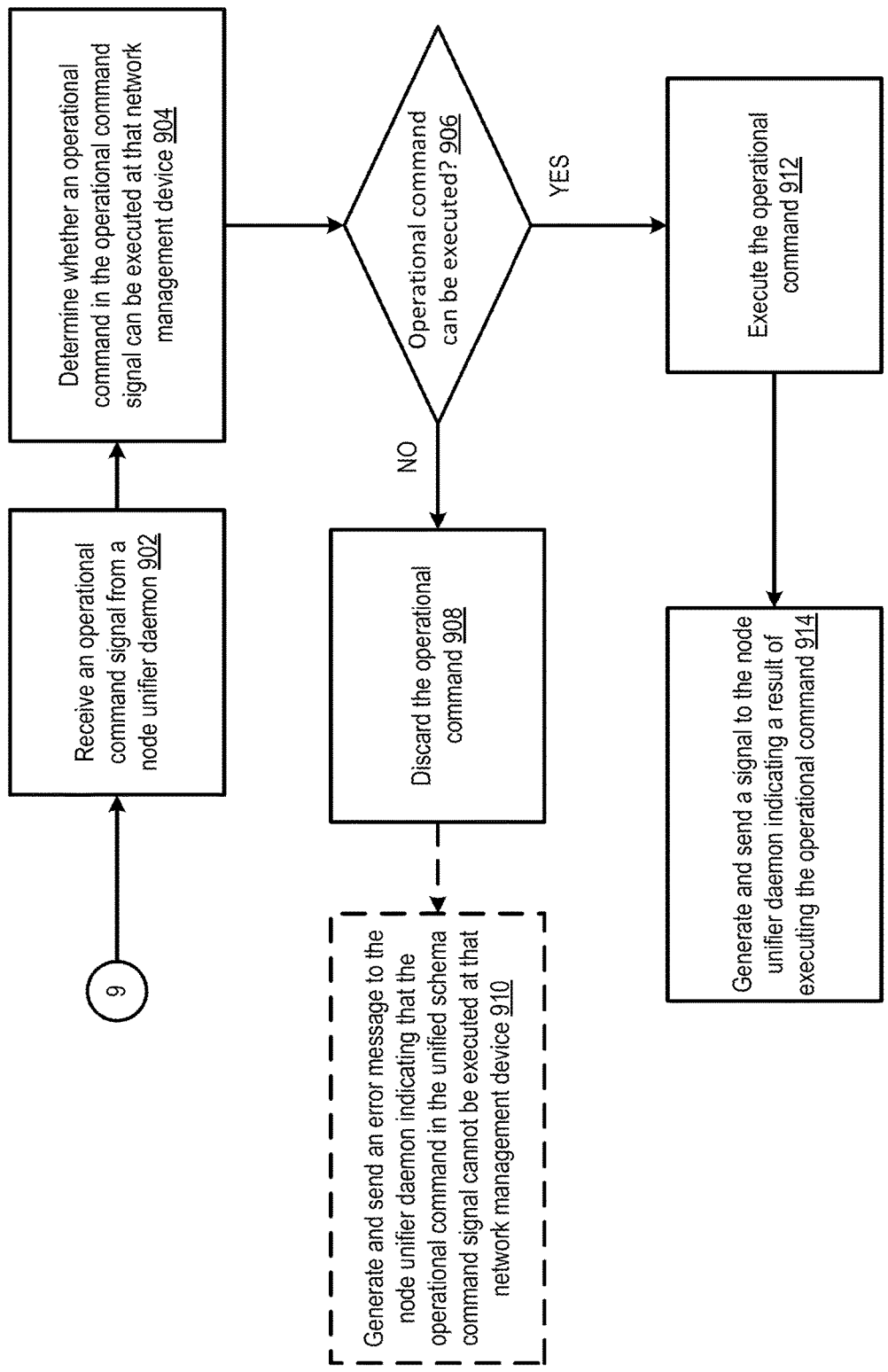
FIG. 9 is logic flow diagram illustrating a network management device processing an operational command, according to an embodiment.

Continuing from FIG. 7 (e.g., from the perspective of a network management device 104), FIG. 9 is logic flow diagram illustrating a network management device 104 processing an operational command 406. For example, in some implementations, each network management device 104 identified both in the operational command signal and the device list schema node (e.g., see FIG. 7) can, at 902, receive an operational command signal (e.g., from a node unifier daemon 212 of a network controller 102). Each of the network management devices 104 can determine, at 904, whether an operational command 406 in the operational command signal from the network controller 102 can be executed at that network management device 104. For example, each network management device 104 can determine whether that network management device 104 can match the operational command 406 to an operational command in a management device schema stored at that network management device 104. If that network management device 104 can match the operational command 406, the network management device 104 can determine that the operational command 406 is executable at that network management device 104.

If (e.g., at 906), that operational command 406 cannot be executed at that network management device 104, that network management device 104 can, at 908, discard the operational command 406 and can optionally, at 910, generate and send an error message to the node unifier daemon 212 indicating that that network management device 104 could not execute the operational command 406. If that network management device 104 can execute the operational command 406, then that network management device 104 can, at 912, execute the operational command 406. The network management device 104 can also, at 914, generate and send a signal to the node unifier daemon 212, e.g., indicating a result of the network management device 104 executing the operational command 406. Information sent by the network management device 104 to the node unifier daemon 212 (e.g., indicating that the operational command 406 was and/or was not executed) can be stored in a log and/or record at the network controller 102.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Clojure©, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A method, comprising:
    merging a plurality of management device schema commands from a plurality of network management device packages with a unified schema to produce unified schema information, the plurality of network management device packages being associated with a plurality of network management devices;
    converting a unified schema command signal into a plurality of management device schema command signals using the unified schema, the unified schema command signal associated with the unified schema information, each management device schema command signal from the plurality of management device schema command signals being associated with a management device schema command from the plurality of management device schema commands;
    when the unified schema command signal includes a device-list option, sending each management device schema command signal from the plurality of management device schema command signals to a node unifier daemon causing the node unifier daemon to send each management device schema command signal from the plurality of management device schema command signals to a network management device that is from a subset of the plurality of network management devices and that is associated with that management device schema command signal; and
    when the unified schema command signal does not include a device-list option sending each management device schema command signal from the plurality of management device schema command signals to a network management device that is from the subset of the plurality of network management devices and that is associated with the management device schema command associated with that management device schema command signal.

2. The method of claim 1, wherein the unified schema includes a command hierarchy of each management device schema command from each management device schema from the plurality of management device schema.

3. The method of claim 1, further comprising:
    merging the plurality of management device schema commands from the plurality of network management device packages with the unified schema by appending command nodes representing the plurality of management device schema commands to the unified schema.

4. The method of claim 1, further comprising:
    associating a device list schema node with a command node of the unified schema when the command node is appended to the unified schema.

5. The method of claim 1, wherein:
    the unified schema includes a device list schema node associated with a command node, the command node representing a unified schema command, and
    the device list schema node indicating a list of network management devices from the plurality of network management devices, each network management device from the list of network management devices configured to execute the unified schema command.

6. The method of claim 1, further comprising:
    receiving the unified schema command signal based on the unified schema information, the unified schema command signal including an instruction for a subset of the plurality of network management devices.

7. The method of claim 1, further comprising:
    receiving a signal from a network management device from the subset of the plurality of network management devices, the signal indicating that the unified schema command signal is applicable to the network management device, and
    instructing the network management device to implement instructions included in the unified schema command signal.

8. A method, comprising:
    receiving a plurality of network management device packages associated with a plurality of network management devices;
    merging a plurality of management device schema commands from the plurality of network management device packages with a unified schema to produce unified schema information;

sending a signal including the unified schema information, receiving a unified schema command signal based on the unified schema information, the unified schema command signal including an instruction for a subset of the plurality of network management devices;

sending the unified schema command signal to each network management device from the plurality of network management devices;

receiving a signal from a network management device from the subset of the plurality of network management devices, the signal indicating that the unified schema command signal is applicable to the network management device;

instructing the network management device to implement instructions included in the unified schema command signal, when the unified schema command signal includes a device-list option, sending each management device schema command signal from a plurality of management device schema command signals, generated based on the unified schema command signal and the unified schema, to a node unifier daemon causing the node unifier daemon to send each management device schema command signal from the plurality of management device schema command signals to a network management device that is from the subset of the plurality of network management devices and that is associated with that management device schema command signal, and when the unified schema command signal does not include a device-list option, sending each management device schema command signal from the plurality of management device schema command signals to a network management device that is from the subset of the plurality of network management devices and that is associated with the management device schema command associated with that management device schema command signal.

9. The method of claim 8, further comprising:
merging the plurality of management device schema commands from the plurality of network management device packages with the unified schema by appending the plurality of management device schema commands to the unified schema.

10. The method of claim 8, wherein:
the unified schema includes a device list schema node associated with a command node, the command node representing a unified schema command, and
the device list schema node indicating a list of network management devices from the plurality of network management devices, each network management device from the list of network management devices configured to execute the unified schema command.

11. The method of claim 8, wherein the network management device from the subset of the plurality of network management devices is a first network management device, the method further comprising:
receiving a signal from a second network management device of the plurality of network management devices, the second network management device being separate from the subset of the plurality of network management devices, the signal received from the second network management device indicating that the unified schema command signal is not applicable to the second network management device.

12. The method of claim 8, further comprising:
associating a device list schema node with a command node of the unified schema when the command node is appended to the unified schema.

13. The method of claim 8, wherein:
the unified schema includes a device list schema node indicating a list of network management devices from the plurality of network management devices, each network management device from the list of network management devices configured to execute a unified schema command,
the unified schema command signal is associated with the unified schema command and includes an instruction to be sent to a network management device not referenced in the device list schema node, and
the method further comprising sending an error message to a network administrator device based on the unified schema command signal including the instruction to be sent to the network management device not referenced in the device list schema node.

14. The method of claim 8, wherein the unified schema command signal includes information associating the unified schema command signal with at least one management device schema command from the plurality of management device schema commands.

15. A method, comprising:
receiving a plurality of network management device packages associated with a plurality of network management devices;
appending a plurality of management device schema commands from the plurality of network management device packages to a unified schema;
generating a unified interface accessible by a network administrator, the unified interface configured to receive instructions from the network administrator to perform operations on a subset of the plurality of network management devices;
converting the instructions received at the unified interface into a plurality of management device schema command signals, each management device schema command signal from the plurality of management device schema command signals being associated with a management device schema command from the plurality of management device schema commands;
sending each management device schema command signal from the plurality of management device schema commands to a network management device from the subset of the plurality of network management devices, the network management device being associated with the management device schema command associated with that management device schema command signal,
receiving a unified schema command signal;
when the unified schema command signal includes a device-list option, sending each management device schema command signal from the plurality of management device schema command signals to a node unifier daemon causing the node unifier daemon to send each management device schema command signal from the plurality of management device schema command signals to a network management device that is from the subset of the plurality of network management devices and that is associated with that management device schema command signal, and
when the unified schema command signal does not include a device-list option, sending each management device schema command signal from the plurality of management device schema command signals to a network management device that is from the subset of the plurality of network management devices and that is associated with the management device schema command associated with that management device schema command signal.

16. The method of claim 15, further comprising:
merging the plurality of management device schema commands from the plurality of network management device packages with the unified schema by appending the plurality of management device schema commands to the unified schema.

17. The method of claim 15, further comprising:
receiving a signal from a network management device from the subset of the plurality of network management devices, the signal indicating that the unified schema command signal is applicable to the network management device, and
instructing the network management device to implement instructions included in the unified schema command signal.

18. The method of claim 15, further comprising:
associating a device list schema node with a command node of the unified schema when the command node is appended to the unified schema.

19. The method of claim 15, wherein:
the unified schema includes a device list schema node indicating a list of network management devices, each network management device from the list of network management devices configured to execute a unified schema command,
the unified schema command signal is associated with the unified schema command and includes an instruction to be sent to a network management device not referenced in the device list schema node, and
the method comprising displaying an error message in the unified interface based on the unified schema command signal including the instruction to be sent to the network management device not referenced in the device list schema node.

20. The method of claim 15, wherein the unified schema command signal includes information associating the unified schema command signal with at least one management device schema command from the plurality of management device schema commands.

\* \* \* \* \*